US012073848B2

(12) United States Patent
Du

(10) Patent No.: US 12,073,848 B2
(45) Date of Patent: Aug. 27, 2024

(54) SYSTEM AND METHOD FOR SWITCHING A FREQUENCY RESPONSE AND DIRECTIVITY OF MICROPHONE

(71) Applicant: Harman International Industries, Incorporated, Stamford, CT (US)

(72) Inventor: Yu Du, Chicago, IL (US)

(73) Assignee: Harman International Industries, Incorporated, Stamford, CT (US)

( * ) Notice: Subject to any disclaimer, the term of this patent is extended or adjusted under 35 U.S.C. 154(b) by 195 days.

(21) Appl. No.: 17/975,075

(22) Filed: Oct. 27, 2022

(65) Prior Publication Data

US 2024/0144950 A1 May 2, 2024

(51) Int. Cl.

| | |
|---|---|
| ***G10L 21/0232*** | (2013.01) |
| ***H04R 1/40*** | (2006.01) |
| ***H04R 3/00*** | (2006.01) |
| *G10L 21/0216* | (2013.01) |

(52) U.S. Cl.
CPC .......... *G10L 21/0232* (2013.01); *H04R 1/406* (2013.01); *H04R 3/005* (2013.01); *G10L 2021/02165* (2013.01); *H04R 2410/01* (2013.01); *H04R 2499/13* (2013.01)

(58) Field of Classification Search
CPC ............. G10L 21/0232; G10L 21/0208; G10L 2021/02166; G10L 2021/02165; G10L 21/02; H04R 1/406; H04R 3/005; H04R 2499/13; H04R 3/04; H04R 2410/01; H04R 2430/20; H04R 29/00
USPC ..... 381/86, 94.3, 94.2, 56, 71.11, 71.4, 320, 381/98, 389, 302, 356
See application file for complete search history.

(56) References Cited

U.S. PATENT DOCUMENTS 7,171,003 B1 * 1/2007 Venkatesh ............. H04M 9/082 381/86
2015/0019212 A1 * 1/2015 Nongpiur ............ G10L 21/0208 704/225
2019/0019526 A1 * 1/2019 Sørensen ............... H04R 25/00

FOREIGN PATENT DOCUMENTS

CN 115186000 A 10/2022

* cited by examiner

*Primary Examiner* — Norman Yu
(74) *Attorney, Agent, or Firm* — Angela M. Brunetti

(57) ABSTRACT

A handsfree system and method to modify at least one microphone output based on a linearized correlation between a modified Speech Intelligibility Index (mSII) and a Mean Opinion Score (MOS). The at least one microphone output signal is compared to predetermined thresholds for the mSII that correspond to a noise condition and the microphone output signal is modified to optimize Speech Intelligibility and Sound Quality for the noise condition.

20 Claims, 7 Drawing Sheets

SYSTEM AND METHOD FOR SWITCHING A FREQUENCY RESPONSE AND DIRECTIVITY OF MICROPHONE

TECHNICAL FIELD

The present disclosure relates to switching frequency response and directivity of a microphone, and more particularly to accurately switching frequency response and directivity of a microphone based on background noise conditions.

BACKGROUND

For hands-free communication applications, and particularly for hands-free communication in a vehicle cabin, the types of microphones chosen for a design depend heavily on use cases targeted by the design. A hands-free communication use case, for example in a vehicle cabin, may be characterized by background noise conditions. Depending on the background noise conditions, some types of microphones used in hands-free communication applications include an omnidirectional microphone with a flat frequency response (FR), an omnidirectional microphone with a rising FR, a unidirectional microphone, or a microphone array that provides directional sensing by strategically combining signals coming from multiple (i.e., ≥2) microphone elements. For an in-vehicle hands-free application, the microphones detect speech of a speaker for a hands-free communication system inside the vehicle cabin. The specific type of microphone used in the hands-free communication system should be designed to provide the highest possible speech intelligibility (SI) and speech quality (SQ) for primary targeted use cases by design, and, ideally, for all use cases.

Noise inside the vehicle cabin is complex and diverse, thereby presenting unique challenges for hands-free communication. Noise from the engine, noise from wind, noise from the heating, ventilation, and air conditioning (HVAC) system, and noise from other passengers in the vehicle can all interfere with the microphone response characteristics, making it difficult to apply only one type of microphone, and/or only one frequency response, and/or only one directivity.

For example, a dominant energy of engine, wind, and HVAC noises are typically concentrated in a low frequency (e.g., <500 Hz) range. And the frequency content that is critical to understanding human speech is generally above 500 Hz. Based on this knowledge, it is a common practice to employ a microphone with a rising frequency response for hands-free speech or voice communication. The rising response microphone has a predefined cut-off frequency (e.g., between 300 Hz and 500 Hz), below which, its sensitivity reduces monotonically with decreasing frequency to purposely filter out low frequency noise. However, the signal below its cut-off frequency also includes speech content, so the rising response microphone will remove speech content below its cut-off frequency as well, making speech sound unnatural in low noise conditions, such as, for example, when the vehicle is idling, stationary, or driving at low speeds. For low noise driving conditions, a microphone with a flat frequency response in the common speech band (e.g., between 50 Hz and 14 kHz) may be preferred. A flat frequency response microphone means that its sensitivity (i.e., amplitude of the microphone signal output per unit acoustic pressure input) is substantially the same over the entire frequency band of interest.

Alternatively, a unidirectional microphone, or a microphone array, may be used because it is able to focus on sound coming from a direction of the speaker. This improves the signal-to-noise ratio (SNR) by spatially filtering out unwanted noise coming from directions other than the direction of the speaker. However, its noise rejecting performance is significantly degraded under wind turbulence-induced noise conditions such as mid-to-high speed driving with open windows.

Because there is not one type of microphone that can provide optimal SI and SQ for all possible noise sources in the vehicle cabin, engineers designing the hands-free communication system must choose a specific type of microphone for the specific vehicle design. A major disadvantage is that performance is satisfactory only for some cases and performance is unsatisfactory for other cases.

A possible solution is to use multiple microphones of different frequency response and/or directivity characteristics, or a microphone with multiple modes and switch the microphone type and/or mode based on an overall noise condition in the vehicle cabin. The microphone output is monitored and compared to a predetermined threshold value. Based on the comparison, the microphone may switch, for example, between an omnidirectional response and a unidirectional response. Unfortunately, a single predetermined threshold comparison does not accurately capture noise vs. speech characteristics, resulting in unwanted switching decision.

There is a need to adaptively alter frequency response and directivity characteristics of a hands-free microphone to optimize SI and SQ when the hands-free microphone used for a hand-free communication system in a vehicle cabin.

SUMMARY

A handsfree system and method to modify at least one microphone output based on a linearized correlation between a modified Speech Intelligibility Index (mSII) and a Mean Opinion Score (MOS). The at least one microphone output signal is compared to predetermined thresholds for the mSII that correspond to a noise condition and the microphone output signal is modified to optimize Speech Intelligibility and Sound Quality for the noise condition.

In one or more embodiments, a handsfree system has a primary microphone having a first frequency response (FR) shape. The primary microphone outputs a measure of noise in a cabin of the vehicle. A modified Speech Intelligibility Index (mSII) is determined by multiplying a standard SII with a weighting coefficient having a value between zero and one. The mSII is linearly correlated with a Mean Opinion Score (MOS) to determine predetermined thresholds for the mSII that correspond to noise conditions. Predetermined filter coefficients are then selected from a lookup table and applied to the primary microphone output based on a comparison between the mSII determined by the primary microphone output and the predetermined mSII thresholds. A filter applies the predetermined coefficients to modify a first FR shape of the primary microphone to a second FR shape that optimizes Speech Intelligibility (SI) and Sound Quality (SQ) for the noise condition.

In one or more embodiments the primary microphone is an omnidirectional microphone, the first FR shape is flat and the second FR shape is rising.

In one or more embodiments, a plurality of predetermined threshold stages further resolves the determination of the noise condition for first and second predetermined thresholds. The further resolution provides a more refined selection and application of predetermined filter coefficients to the microphone output signal to optimize SI and SQ.

In one or more embodiments the handsfree system has a microphone module having primary and secondary microphones. A beam forming algorithm is applied to the primary and secondary microphone output signals to modify a directivity from omnidirectional to unidirectional.

Figure 1:
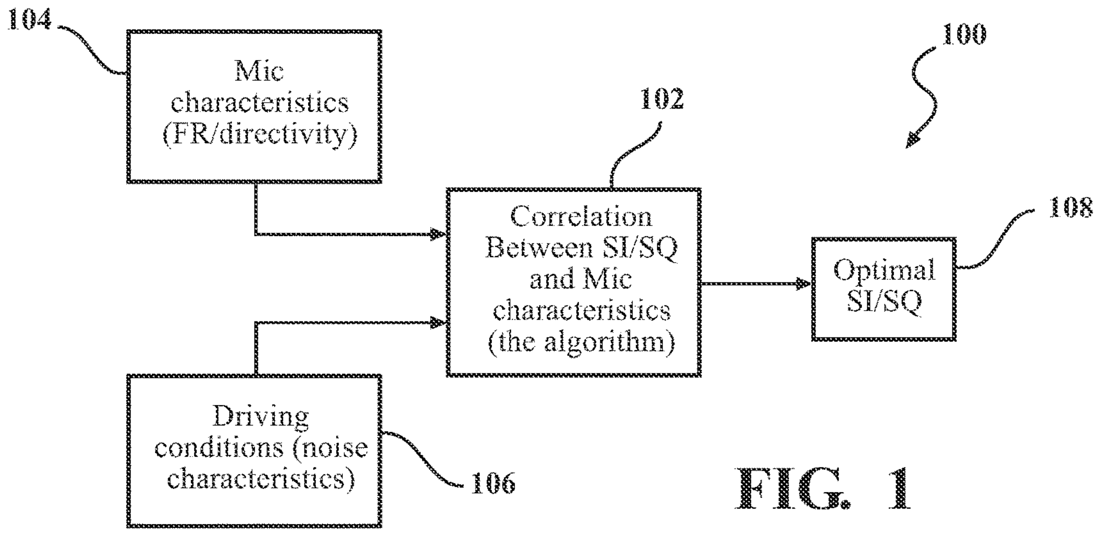
FIG. 1 is a block diagram of a method of the inventive subject matter.

Elements and steps in the figures are illustrated for simplicity and clarity and have not necessarily been rendered according to any sequence. For example, steps that may be performed concurrently or in different order are illustrated in the figures to help to improve understanding of embodiments of the present disclosure.

DETAILED DESCRIPTION

While various aspects of the present disclosure are described with reference to FIGS. 1-10, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

As discussed above, a unidirectional microphone typically provides higher SNR, and therefore better SI, under most driving conditions that do not involve direct wind turbulent noise. An omnidirectional microphone, on the other hand, performs better when driving conditions include wind noise. Furthermore, an omnidirectional microphone with a rising frequency response (FR) may perform better than one with a flat FR, yet the flat FR has a wider bandwidth making it more appropriate for natural sounding speech. The inventive subject matter adaptively alters the FR and directivity characteristics of a microphone to optimize speech intelligibility (SI) and speech quality (SQ) for multiple driving conditions. To accomplish this, a switching algorithm that accurately differentiates multiple driving conditions, including, but not limited to, direct wind turbulence and non-wind noise, directional noise and non-directional noise, low/mid/high-level noise, and noise with different spectrum characteristics, also known as spectrum coloration.

Many factors, such as signal SNR, distortion, speech spectrum, noise spectrum, etc., are related to SI and SQ performance. And there are multiple known methods for evaluating SI and SQ performance of a communication system. Many are standardized and adopted for scientific evaluation and/or product development. For example, ANSI S3.5-1997 describes an objective method to calculate a SI index (SII). This method provides reasonable correlation using intelligibility data obtained from human subjects. However, SII does not necessarily consider all important psychoacoustical effects of noise (human perceptions of noise). ANSI S3.5-1997 purposely focuses more on the intelligibility factor of the speech signal and less on the quality factor.

Another example method, ITU-T P862.2 provides a perceptual evaluation of a SQ model to calculate a Mean-Opinion-Score (MOS) that corresponds to human subjective evaluation. The MOS prediction is generally accepted as a better approach compared to SII as it inherently considers both the intelligibility factor of the speech signal and the quality factor. However, a MOS evaluation method that is based on, or similar to, the ITU-T P862.2 process is difficult to implement in real-world product designs due to its computational complexity.

Although SI and SQ are sometimes used interchangeably, there are distinct differences. SI emphasizes a degree to which speech may be understood by a listener. On the other hand, SQ may be considered a measure more representative of human perception. SQ, in addition to the degree to which speech may be understood by the listener, includes a degree of satisfaction of the listener as well as a naturalness and listening effort required for the listener to understand speech. For this reason, SQ is typically only evaluated using human subjects, which is why it is primarily used in laboratory evaluations. ITU-T has recommendations P862, P862.2 and P863 that describe a mathematical process to derive the MOS based on objective measurements only, removing the need for actual human subjects. However, the process is still complex and costly to implement in real-world product applications.

FIG. 1 is a block diagram of a method 100 of the inventive subject matter that overcomes the drawbacks discussed above. The method 100 correlates 102 SI and SQ with microphone characteristics 104 based on driving conditions 106. The result is an optimal SI/SQ output 108 to be implemented by a hands-free communication system (not shown).

Figure 2:
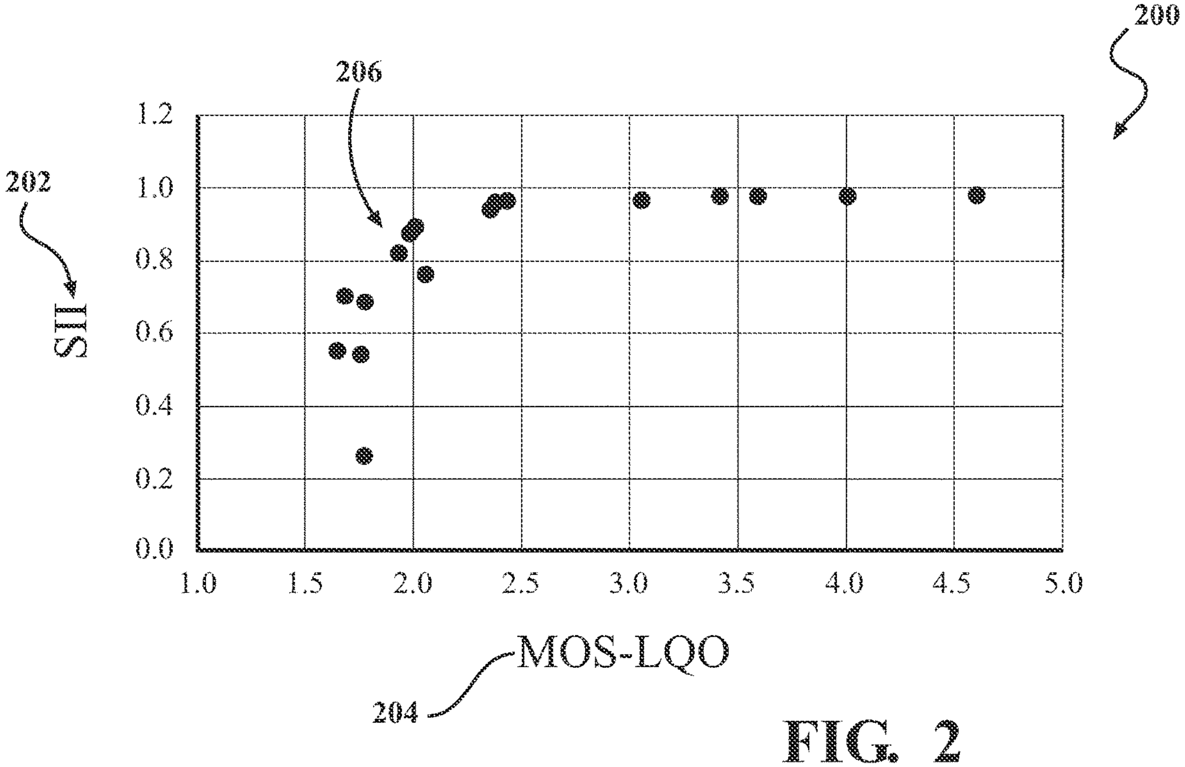
FIG. 2 is a graphical correlation between standard Speech Intelligibility Index (SII) and Mean-Opinion-Score (MOS)

FIG. 2 is a graphical correlation 200 between SII 202 and MOS 204, obtained experimentally. The SII and MOS-LQO (Listening Quality Objective) data are calculated following ANSI S3.5-1997 and ITU-T P862.2, respectively. The plot 206, appears to be highly non-linear. SII results do not have sufficient resolution to predict MOS scores above 2.5. The inventive subject matter linearly correlates SII with the MOS to accurately predict MOS based on a form of SII derivation. Because SII calculations are straightforward, this provides an effective way to determine how to switch a microphone working mode based on the MOS prediction obtained from a linearized SII-MOS relationship.

Figure 3:
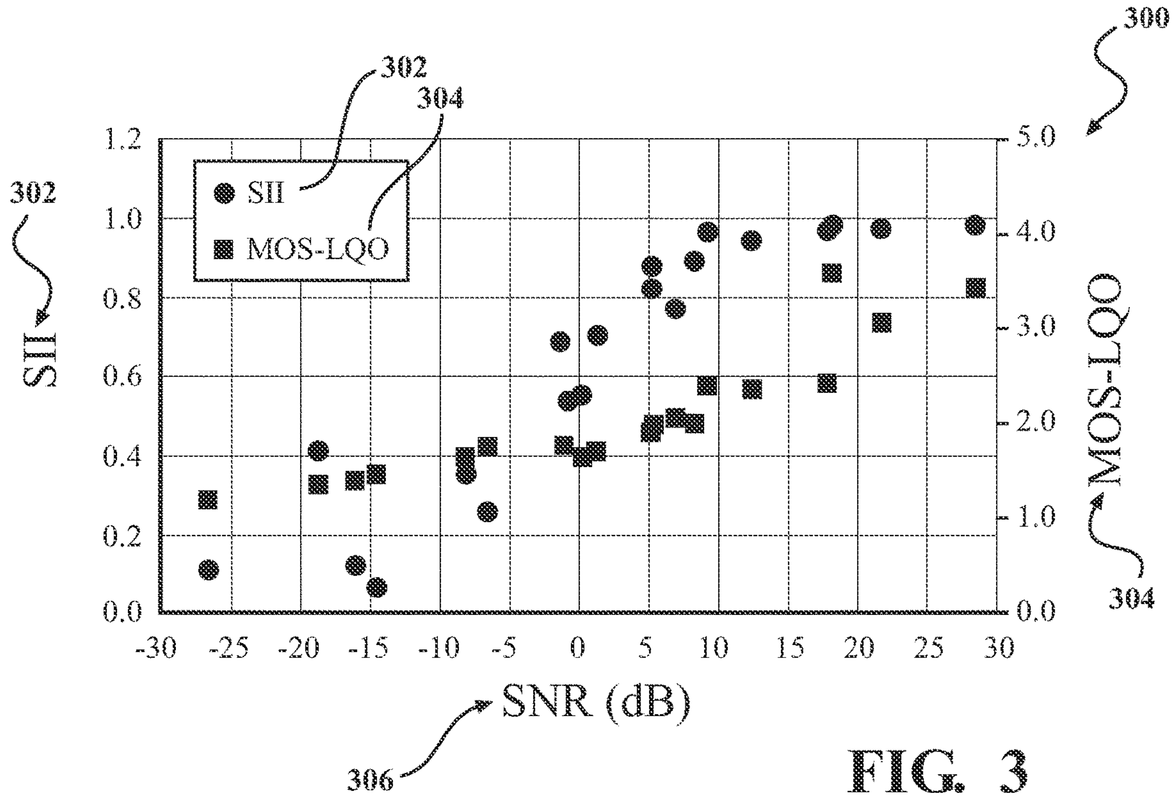
FIG. 3 is a graphical comparison of standard SII and MOSs as compared to Signal-to-Noise-Ratio (SNR)

Further analysis showed that SII changes rapidly around SNR of 0 dB. FIG. 3 is a graphical comparison 300 of SII 302 and MOS scores 304 as compared to SNR 306. This shows the reason SII cannot effectively predict MOS values above 2.5. The inventive subject matter mathematically modifies an original SII calculation to force a result that linearly correlates SII with MOS.

In one or more embodiments, the SII is mathematically modified by weighting SII data with an overall signal SNR. Referring back to FIG. 3, a goal is to bring the SII curve closer to the MOS curve through a mathematical weighting procedure. Equations (1) and (2) describe on example way to realize such a procedure:

$$f(snr)=1-c*\Gamma_{pdf}(snr+s,A,B) \tag{1}$$

$$\text{mSII}=f(snr)*SII \tag{2}$$

In Equation (1), f(snr) is a weighting function based on an unweighted SNR. $\Gamma_{pdf}$(snr+s, A, B) is a Gamma probability density function, $\Gamma_{pdf}$, with scale parameters A and B. Since a negative input variable will result in a $\Gamma_{pdf}$ value of 0, the input SNR (denoted by snr) value is shifted by a positive s dB to ensure negative SNR values are considered. Depending on the values of A and B, a proper coefficient, c, is determined to guarantee the resulting f(snr) value is between 0 and 1. Referring now to Equation (2), the modified SII value, mSII, is obtained by multiplying the weighting function value f(snr) with the original SII value.

Figure 4:
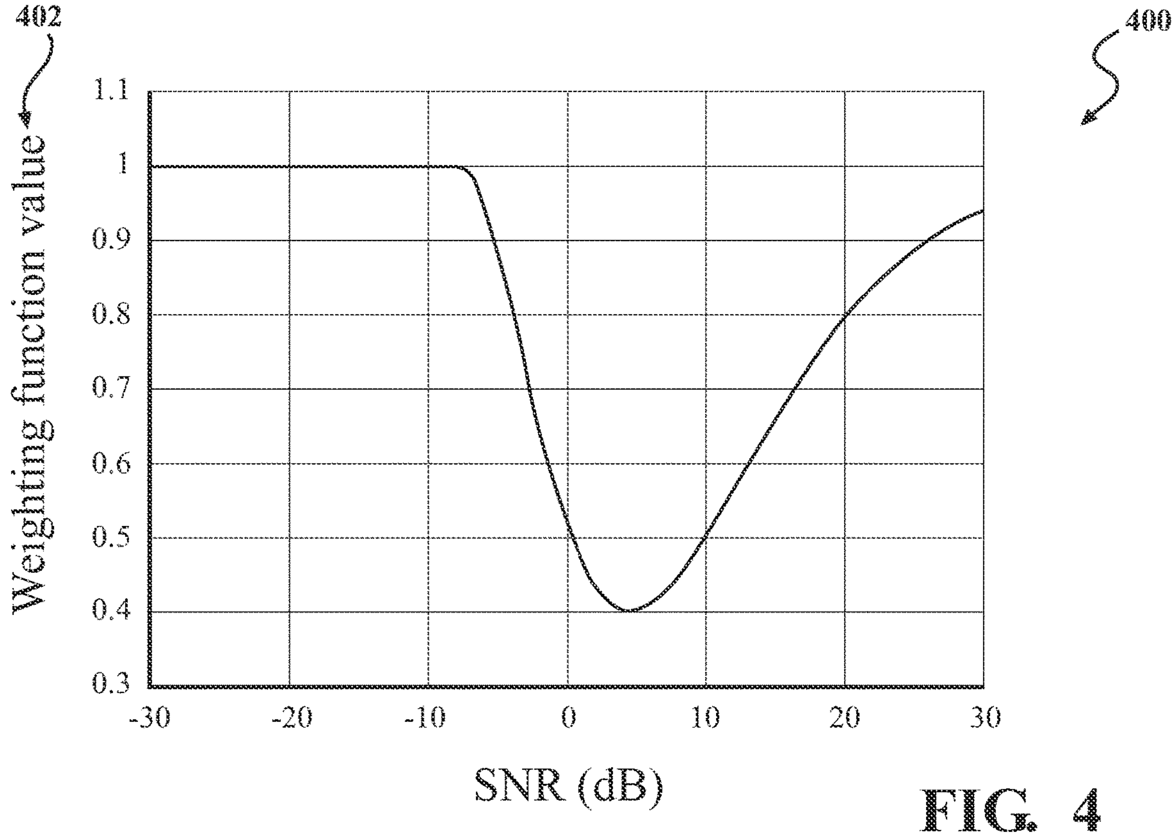
FIG. 4 is a plot of sample weighting function values.
Figure 5:
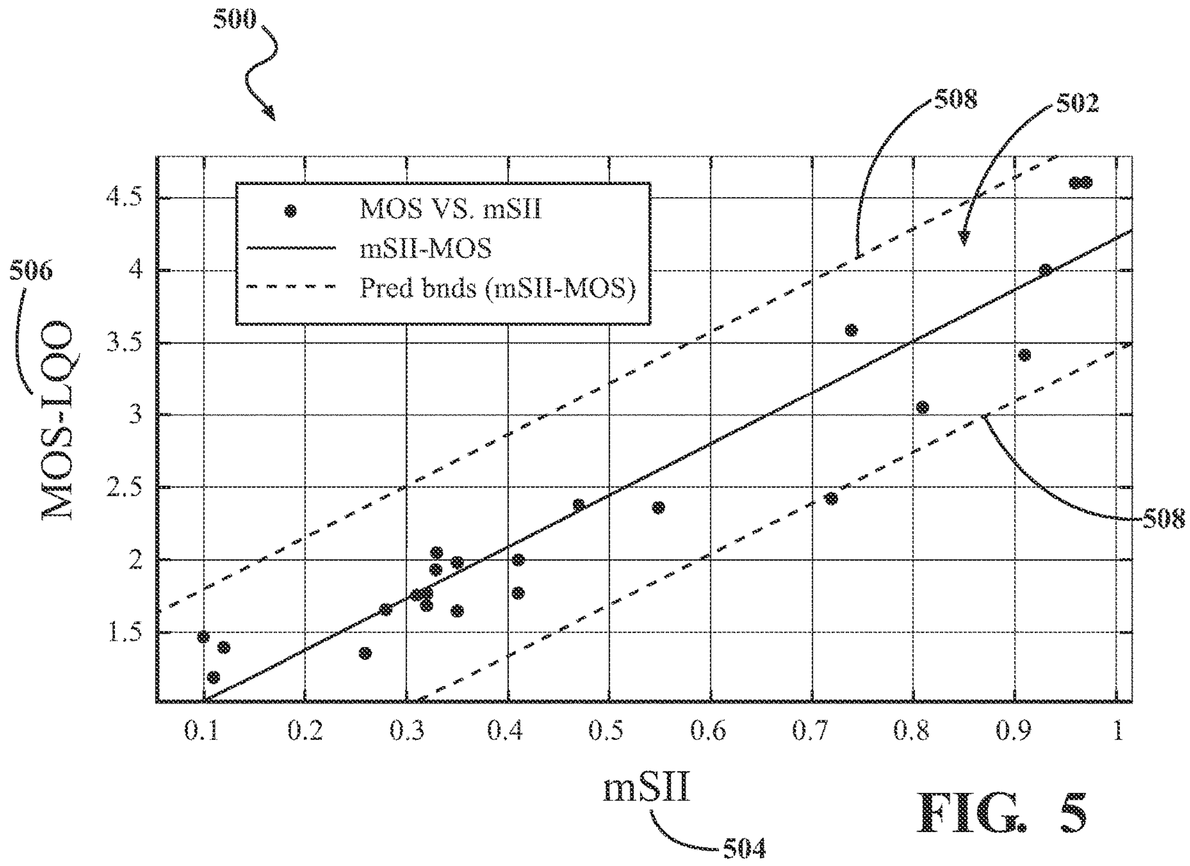
FIG. 5, a linear correlation between the modified SII, mSII, and MOSs.

FIG. 4 is a plot 400 of sample weighting function values 402 calculated with Equation (1) for SNR between −30 and +30 dB. Parameter values are A=3.5, B=5, c=12.24, and s=8. Referring now to FIG. 5, a plot 500 shows a linear correlation 502 between the modified SII, mSII, 504 and MOS scores 506. The correlation coefficient, c, reaches 0.95, and all experimental data points of MOS can again be fundamentally predicted by the modified SII data within 95% confidence intervals 508.

The modified SII, mSII, is used as an indication of SI/SQ performance measured with MOS score. The correlation between the mSII and MOS, as shown in FIG. 5, demonstrates that mSII may be used to adjust microphone output characteristics, including FR and directivity, to provide optimal performance for different driving conditions.

Figure 6:
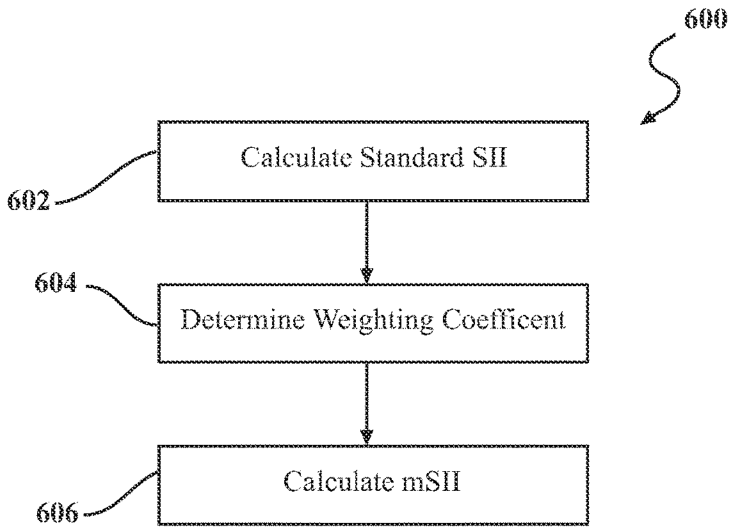
FIG. 6 is a flow chart of a method for calculating mSII.

FIG. 6 is a flow chart 600 of a method for calculating the mSII. At step 602, standard SII is calculated. The process of calculating standard SII is known and is described, for example, in ANSI S3.5-1997. A measured noise spectrum and a standard speech spectrum are inputs to calculate sub-band SNRs for eighteen one-third octave bands between 160 and 8000 Hz. A standard SII value is derived based on weighted sub-band SNRs.

Once the standard SII is calculated, at step 604 a weighting coefficient related to the total signal SNR, f(snr), is determined using Equation (1) above. In Equation (1) the $\Gamma_{pdf}$ function is:

$$\Gamma_{pdf}(x, A, B) = \frac{1}{B^A\Gamma(A)}x^{A-1}e^{\frac{-x}{B}} \tag{3}$$

and $$\Gamma(x) = \int_0^\infty e^{-t}t^{z-1}dt \tag{4}$$

$$c = 0.6/\text{Max}(\Gamma(z)) \tag{5}$$

And at step 606, mSII is calculated using Equation (2) above which multiples the weighting coefficient and the standard SII. The modified SII, mSII, is compared to one or more predetermined threshold values. The threshold values correspond to background noise conditions and are used to switch microphone characteristics, including FR and directivity, as needed to optimize SI/SQ.

Figure 7:
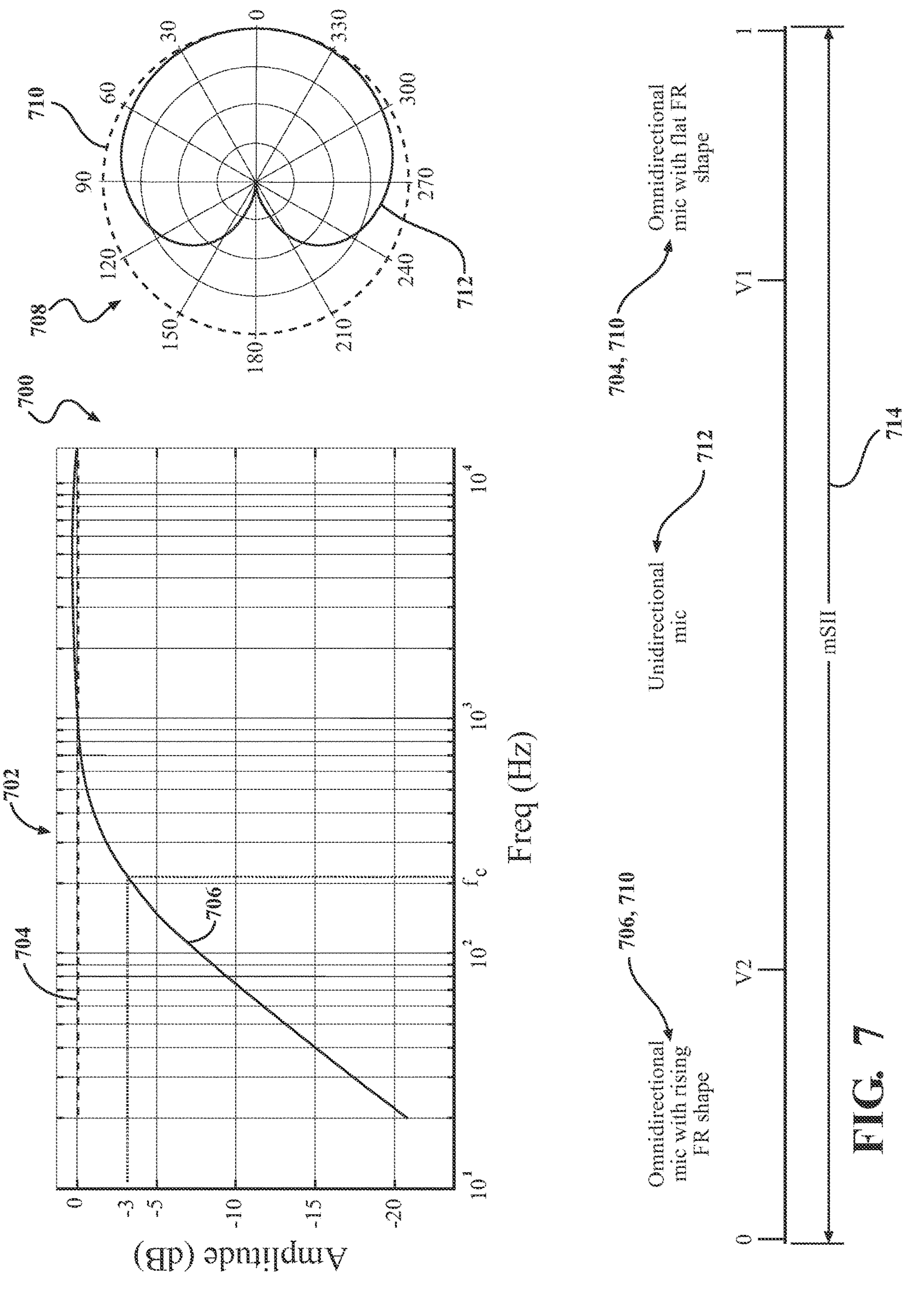
FIG. 7 shows results of a study using three types of microphones.

FIG. 7 shows results 700 from a study using an omnidirectional microphone with a flat FR, an omnidirectional microphone with a rising FR, a unidirectional microphone, or a microphone array. Graph 702 shows the FR for an omnidirectional microphone having a flat FR 704, and an omnidirectional microphone having a rising FR 706. Graph 708 shows the directivity 710 for the omnidirectional microphone and the directivity 712 for the unidirectional microphone. For a calculated mSII value between 0 and 1, the linearized relationship between mSII and MOS (see FIG. 5) shows that it is most effective to use the omnidirectional microphone with flat FR when mSII≥V1, where V1 is a first predetermined threshold value, and for the present example, has a value between 0.8 and 0.9. The omnidirectional microphone with rising FR is most effective when mSII≤V2, where V2 is a second predetermined threshold value, and for the present example, has a value between 0.3 and 0.4. The unidirectional microphone is most effective for V2<mSII<V1. This is depicted in FIG. 7 on the sliding scale graphic 714.

The modified SII, mSII, is an indication of SI/SQ performance measured with the Mean Opinion Score (MOS). The linearized correlation between mSII and MOS allows mSII to be used to adjust microphone output characteristics (FR and directivity) to optimize microphone performance under differing automotive driving conditions. According to the inventive subject matter, the mSII criteria may be applied to switch an output between a flat FR and a rising FR. Alternatively, or additionally, it may be applied to switch between an omnidirectional microphone to a unidirectional microphone, which may also include switching between the flat and rising FRs for the omnidirectional microphone.

Figure 8:
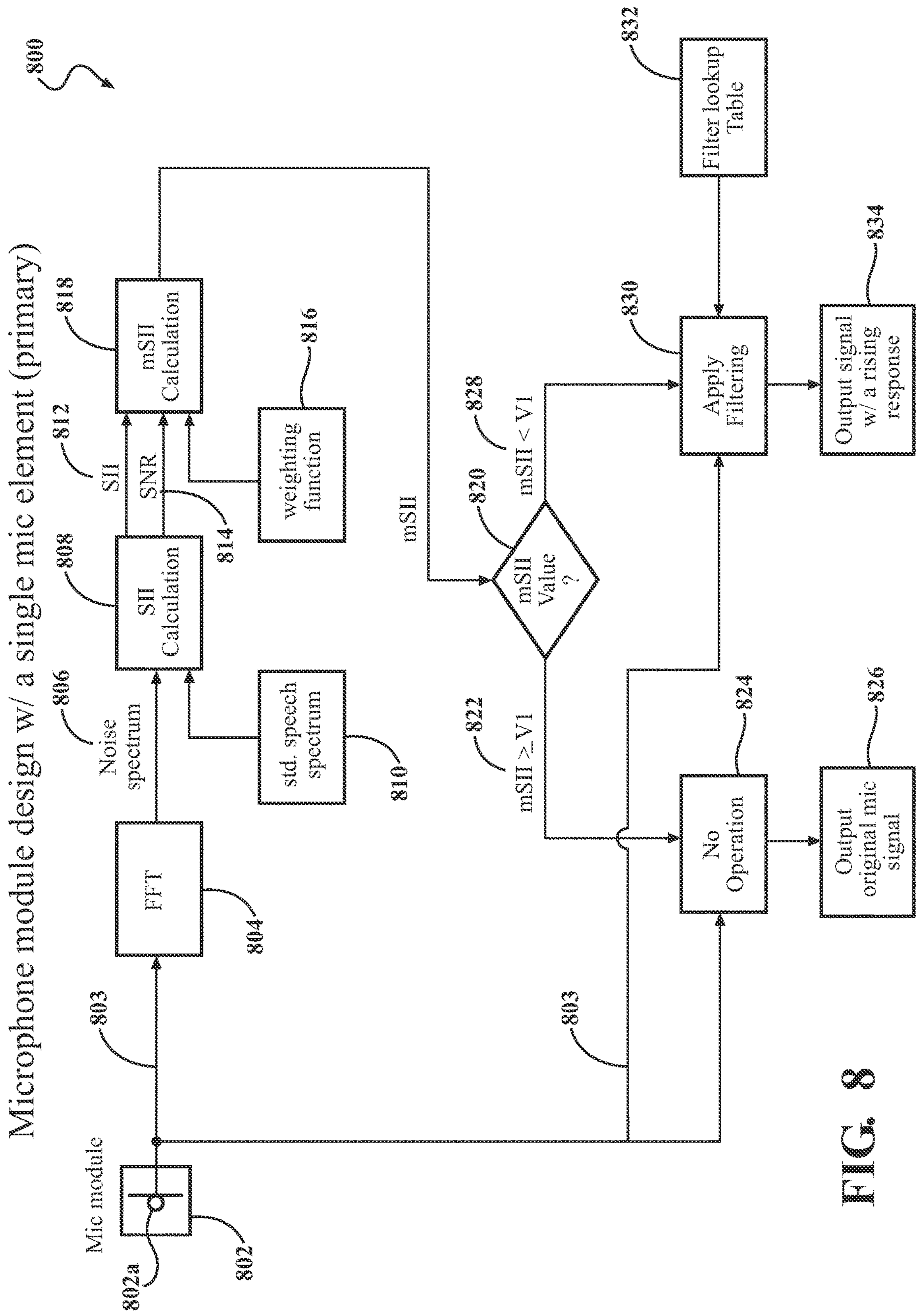
FIG. 8 is a block diagram of one or more embodiments of the inventive subject matter.

FIG. 8 is a block diagram 800 of a design having a single microphone element 802*a* in a microphone phone module 802. In the example shown in FIG. 8, the single microphone element 802*a* is an omnidirectional microphone. The mSII is used to switch an output of the microphone FR between a flat response, which has a wider bandwidth, and a rising response, which applies to less low frequency noise and speech content. In an ideal situation, the microphone element 802*a* has a flat FR shape in the common speech band between 50 Hz and 14 kHz, or ideally in the entire audio band from 20 Hz to 20 kHz. During normal operation, the microphone 802 monitors the noise in the vehicle cabin by measuring background noise. The measured signal 803 is fed to a Fast Fourier Transform (FFT) block 804 where a noise spectrum 806 is generated and output into a block 808 to calculate a standard SII. The calculation of the standard SII at block 808 also uses a standard speech spectrum 810. The standard speech spectrum 810 may be stored in a lookup table. The standard SII 808 may be calculated following any known method, such as the process outlined in ANSI S3.5-1997.

The standard SII block 808 outputs an SII 812 and a SNR 814 which, along with a weighting function 816, is fed into block 818 to calculate the modified SII (mSII) using Equations (1) and (2) described earlier herein. At decision block 820 the mSII value is compared to the first predetermined threshold value, V1. When mSII is greater than or equal to V1 822, this indicates low noise conditions and no change 824 is made to the operation of the microphone and the microphone maintains 826 an omnidirectional signal with a flat FR. The original microphone signal 803 is output with no filtering. Under low noise conditions, the microphone with a flat FR will provide sufficient SI and provide optimal SQ.

A high noise condition is determined when mSII is less than the first predetermined threshold, V1, 828. For high noise conditions, a high pass filter 830 is applied to the original microphone signal 803. Design coefficients for the high pass filter 830 may be stored in a lookup table 832 and are selected from the lookup table based on the mSII. Application of the high pass filter 830 to the microphone signal 803 results in a microphone output that has a rising FR shape 834. The rising FR shape helps to remove noise that is typically dominant in the low frequency range, thereby improving SI and SQ.

The signal processing blocks and steps may be carried out within the microphone element 802*a* itself or within the microphone module 802 if the microphone element 802*a* or the microphone module 802 includes a built-in digital signal processor (DSP). Alternatively, a DSP in another system element, such as an amplifier or a head unit, may carry out the processing blocks and steps.

Figure 9:
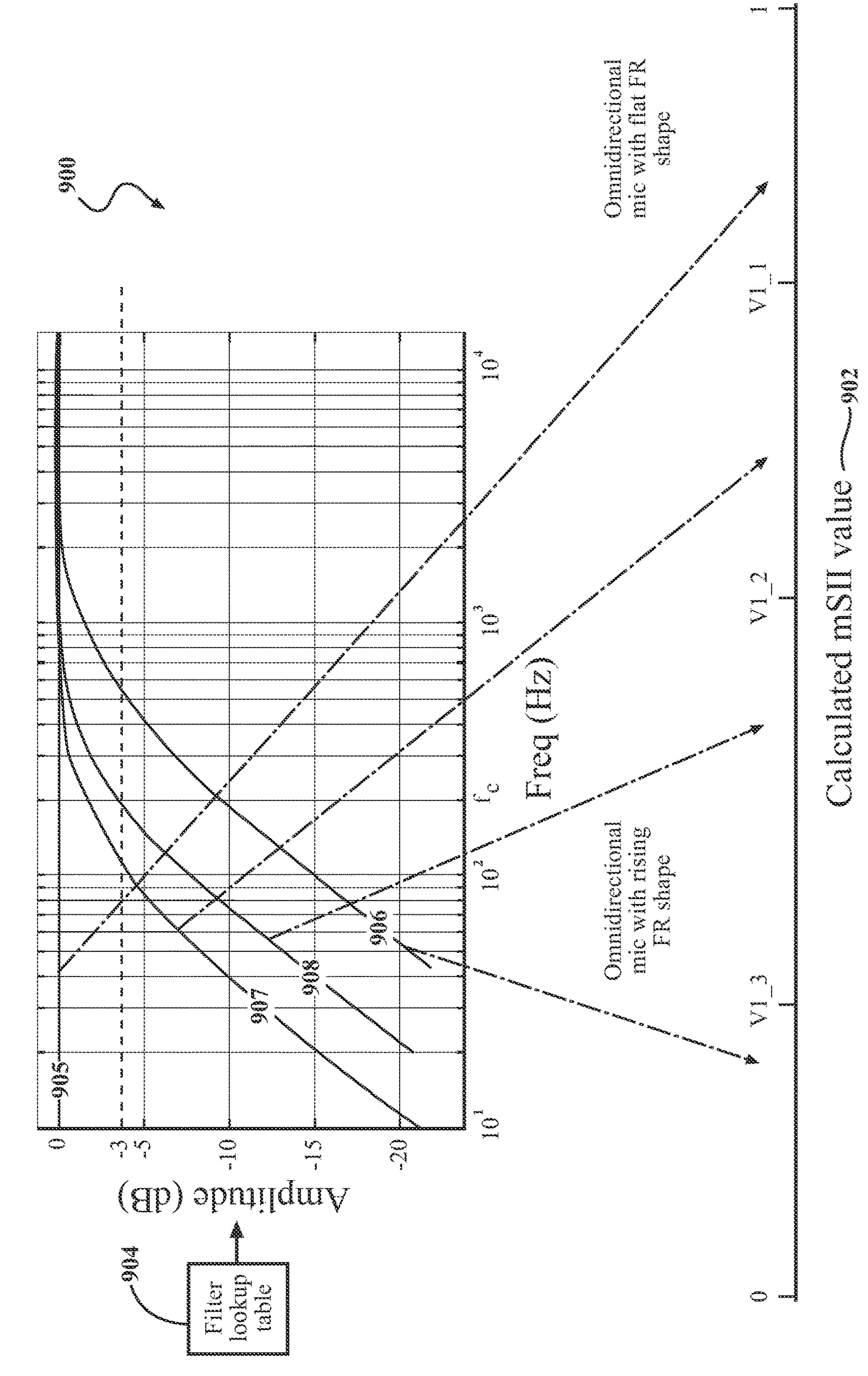
FIG. 9 is a block diagram of an example of how the system of FIG. 8 correlates the mSII value with optimal microphone output settings.

With only a single omnidirectional microphone element, the directivity of microphone module 802 cannot be altered to be unidirectional. Therefore, the entire range when mSII<V1, as depicted in FIG. 7 on the sliding scale graphic 714, shall be accommodated by an omnidirectional microphone with a rising FR. At different noise conditions, as indicated by the mSII levels, a rising response microphone with different cut-off frequencies may be needed to obtain optimal SI/SQ. This can be achieved by inserting new threshold stages. The new threshold stages are predetermined thresholds in addition to V1 and V2 as illustrated in FIG. 9. The additional predetermined thresholds provide increased resolution for determining when to switch the FR or directivity based on noise conditions indicated by the mSII value.

FIG. 9 is a block diagram 900 showing an example of how the system of FIG. 8 correlates the mSII value 902 with optimal microphone output settings. As shown in the sliding scale graphic 902, three additional predetermined threshold stages, V1_1, V1_2, and V1_3, separate the entire possible range of mSII which may occur while a single omnidirectional microphone is monitoring the vehicle cabin under varying driving conditions. V1_1 is a first additional predetermined threshold representing a modified SII, mSII, that is greater than or equal to the first predetermined threshold, V1. Low noise conditions correspond to mSII values at or above the first predetermined threshold, V1. For low noise conditions the system will not trigger processing the output of the omnidirectional microphone having a flat FR shape. The output is allowed to pass through unprocessed, or unfiltered, that is represented by curve 905. This is because, as discussed above, the omnidirectional microphone having a flat FR shape is a preferred design for low noise in the vehicle cabin.

V1_2 is a second predetermined threshold stage for mSII that is less than the first predetermined threshold, V1, but is larger than the second predetermined threshold, V2. For the present example, V1_2 has a value between 0.5 and 0.6. An mSII falling between the first predetermined threshold stage V1_1 and the second predetermined threshold stage V1_2 indicates a slightly increased noise condition. Under the slightly increased noise condition, high pass filtering the signal with a low cut-off frequency (e.g., 100 Hz), as represented by curve 907, helps improve SNR while conserving low frequency speech content. The microphone output is processed using the high pass filter with predetermined coefficients selected from a look up table 904. The filtered signal will be output as an omnidirectional microphone output with a rising frequency response that is optimal for the noise condition relevant to the calculated modified SII, mSII, for values between V1_1 and V1_2.

A third additional predetermined threshold stage V1_3 has a value lower than or equal to the second predetermined threshold V2. At high noise conditions, when mSII falls below V1_3, the system will apply the filter with coefficients selected from a lookup table 904 to generate an omnidirectional output with a rising FR having a high cut-off frequency (e.g., 500 Hz) as represented by curve 906. This is optimal for achieving the best SI/SQ at high noise conditions as predicted by the modified SII, mSII.

Similarly, for a modified SII, mSII that falls between the second predetermined threshold stage, V1_2, and the third predetermined threshold stage, V13, the system will apply a high pass filter with coefficients selected from the lookup table 904 that is less rigorous than curve 906, but more rigorous than curve 907, resulting in curve 908. This will generate an omnidirectional microphone output with a rising frequency response that is optimal for achieving the best SI/SQ for the noise condition corresponding to the calculated modified SII, mSII, values between V1_2 and V1_3.

It should be noted that the example presented in FIG. 9 is one way to implement the system depicted in FIG. 8. For example, more than one additional predetermined threshold values may be added between the first predetermined threshold V1 and the second predetermined threshold V2, if necessary. Consequently, four or more mSII ranges may result, as shown by the sliding scale graphic 902. Each range would correspond to a flat or rising FR with a different cut-off frequency.

Figure 10:
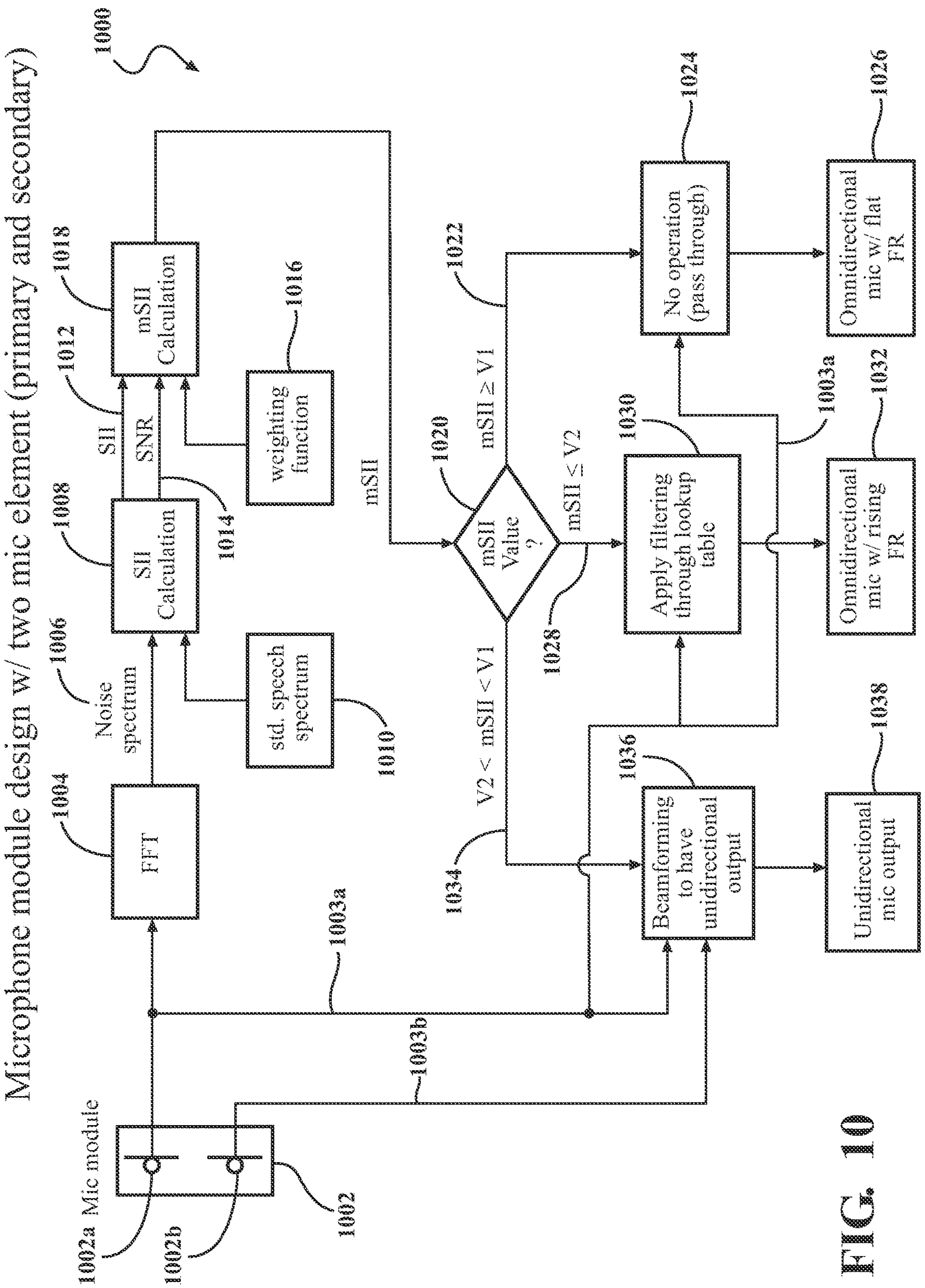
FIG. 10 is a block diagram of one or more embodiments of the inventive subject matter.

FIG. 10 is a block diagram 1000 of a design with a microphone module 1002 that has a primary microphone element 1002*a* and a secondary microphone element 1002*b*. In this arrangement, the mSII is used to not only switch an output of the microphone FR between a rising FR and a flat FR, but it will also initiate a change in the directivity from omnidirectional to unidirectional for certain driving conditions. For one of several embodiments, each microphone element 1002*a*, 1002*b* is an omnidirectional microphone having a flat FR shape in the common speech band between 50 Hz and 14 kHz, or ideally in the entire audio band from 20 Hz to 20 kHz. During normal operation, the primary microphone 1002*a* monitors background noise. The microphone signal 1003*a* from the primary microphone 1002*a* (measurement of background noise) is fed into a FFT block 1004 where a noise spectrum 1006 is generated and output into block 1008 to calculate a standard SII. The calculation of the standard SII at block 1008 also uses a standard speech spectrum 1010. The standard speech spectrum 1010 may be stored in a lookup table. The standard SII may be calculated using any known method, such as the process outlined in ANSI S3.5-1997.

The standard SII block 1008 outputs an SII 1012 and an SNR 1014 which, along with a weighting function 1016, is fed into block 1018 to calculate the modified SII (mSII) using Equations (1) and (2) described earlier herein. At decision block 1020, the mSII value is compared to the first predetermined threshold value, V1 and the second predetermined threshold value, V2.

Low noise conditions may be indicated when mSII is greater than or equal to V1 1022. For low noise conditions 1022, the primary microphone signal 1003*a* is output 1024 without any processing as omnidirectional with flat FR 1026. This scenario is for low noise use cases when the microphone with flat FR is sufficient for SI and SQ.

High noise conditions, such as noise typically caused by wind turbulence, may be indicated when mSII is less than or equal to V2 1028. In this scenario a high pass filter 1030 is applied to one of the primary or secondary microphones 1002*a*, 1002*b* to generate a microphone output 1032 having a rising FR shape. The high pass filter 1030 has design coefficients that may be stored in a lookup table. The microphone signal having a rising FR shape 1032 will provide relatively optimal SI and SQ for high noise conditions in the vehicle cabin.

Medium to high noise conditions may be indicated when mSII is somewhere between V1 and V2, 1034. For medium to high noise conditions, a unidirectional microphone output is the preferred design choice. When mSII falls between the first and second predetermined thresholds, V1 and V2, 1034, the outputs 1003*a*, 1003*b* of the primary microphone 1002*a* and the secondary microphone 1002*b* are combined 1036 in an algorithm to form an array (a two-element array in the present example) that produces a unidirectional output 1038.

The signal processing blocks and steps may be carried out within the microphone elements 1002*a*, 1002*b*, or the microphone module 1002 if the microphone elements 1002*a* and 1002*b* or the microphone module 1002 include a built-in digital signal processor (DSP). Alternatively, a DSP in another system element, such as an amplifier or a head unit, may carry out the processing blocks and steps.

The inventive subject matter adaptively adjusts frequency response and directivity for one or more microphones to optimize SI and SQ performance for a variety of driving conditions. A switching algorithm establishes a linear correlation between standard SII and a MOS score to calculate a modified SII. The modified SII is compared to predetermined threshold values and a determination is made whether the microphone output, FR, and directivity, should be adjusted to optimize SI and SQ performance in the presence of varying noise sources. More specifically, the inventive subject matter may apply to an automotive hands-free microphone and its ability to detect, and compensate for, noise that occurs in the vehicle cabin under varying driving conditions that interferes with the hand-free microphone's ability to detect speech.

The inventive subject matter references national and international standards on SI and SQ evaluations. The inventive subject matter uses overall noise spectrum characteristics and applies a weighting characteristic to accurately differentiate driving conditions. The inventive subject matter determines, based on a driving condition, whether to process the microphone output in a manner that optimizes SI and SQ performance, even as driving conditions change.

In the foregoing specification, the present disclosure has been described with reference to specific exemplary embodiments. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order, may be executed repeatedly, and are not limited to the specific order presented in the claims. Additionally, the components and/or elements recited in any apparatus claims may be assembled or otherwise operationally configured in a variety of permutations and are accordingly not limited to the specific configuration recited in the claims. Any method or process described may be carried out by executing instructions with one or more devices, such as a processor or controller, memory (including non-transitory), sensors, network interfaces, antennas, switches, actuators to name just a few examples.

Benefits, other advantages, and solutions to problems have been described above regarding embodiments; however, any benefit, advantage, solution to problem or any element that may cause any particular benefit, advantage, or solution to occur or to become more pronounced are not to be construed as critical, required, or essential features or components of any or all the claims.

The terms "comprise", "comprises", "comprising", "having", "including", "includes" or any variation thereof, are intended to reference a non-exclusive inclusion, such that a process, method, article, composition, or apparatus that comprises a list of elements does not include only those elements recited but may also include other elements not expressly listed or inherent to such process, method, article, composition, or apparatus. Other combinations and/or modifications of the above-described structures, arrangements, applications, proportions, elements, materials, or components used in the practice of the present disclosure, in addition to those not specifically recited, may be varied, or otherwise particularly adapted to specific environments, manufacturing specifications, design parameters or other operating requirements without departing from the general principles of the same.

What is claimed is:

1. A handsfree system for use in a vehicle, the system comprising:

a primary microphone having a first frequency response (FR) shape, the primary microphone outputs a signal representative measure of noise in a cabin of the vehicle;

a signal processor having an input connected to an output of the primary microphone;

a modified Speech Intelligibility Index (mSII) determined from the primary microphone output by multiplying a standard SII with a weighting coefficient, the weighting coefficient having a value between zero and one;

a linearized correlation between the mSII and a Mean Opinion Score (MOS);

a first predetermined threshold for the mSII, the first predetermined threshold corresponds to a first noise condition in the vehicle cabin;

a second noise condition in the vehicle cabin; and a high pass filter that applies predetermined filter coefficients to the primary microphone output when the output of the primary microphone output has an mSII that is less than the first predetermined threshold, the predetermined filter coefficients are selected from a lookup table to modify the first FR shape of the primary microphone to a second FR shape that corresponds to the second noise condition in the vehicle cabin.

2. The system as claimed in claim 1, wherein the primary microphone is an omnidirectional microphone, the first FR shape is flat, and the second FR shape is rising.

3. The system as claimed in claim 1, further comprising:

a second predetermined threshold for the mSII;

the first and second predetermined thresholds further comprise a plurality of predetermined threshold stages, each predetermined threshold stage in the plurality of predetermined threshold stages is defined by a range of mSII values that correspond to a noise condition; and the high pass filter selects the predetermined filter coefficients from the lookup table according to the noise condition detected by the primary microphone.

4. The system as claimed in claim 3, wherein the plurality of predetermined threshold stages further comprises:

a first predetermined threshold stage that is greater than or equal to the first predetermined threshold;

a second predetermined threshold stage that is less than the first predetermined threshold and greater than the second predetermined threshold; and a third predetermined threshold stage that is less than or equal to the second predetermined threshold.

5. The system as claimed in claim 4, wherein the high pass filter selects and applies filter coefficients that filter the output of the primary microphone for optimal SI/SQ at a noise condition associated with the predetermined threshold stage.

6. The system as claimed in claim 1, wherein when the mSII determined from the primary microphone output signal is greater than or equal to the first predetermined threshold, the primary microphone output bypasses the high pass filter.

7. The system as claimed in claim 1, wherein the system further comprises:

a secondary microphone; and the high pass filter applies predetermined filter coefficients to either the primary microphone or the secondary microphone when the mSII determined from primary microphone output signal is less than the first predetermined threshold to adapt the first FR shape of the primary or secondary microphone to a second FR shape.

8. The system as claimed in claim 7, wherein the primary and secondary microphones are omnidirectional microphones, the first FR shape is flat, and the second FR shape is rising.

9. The system as claimed in claim 7, further comprising a beam forming algorithm, when the mSII determined from the primary microphone output signal is less than the first predetermined threshold and greater than the second predetermined threshold the beam forming algorithm combines outputs from the primary and secondary microphones to generate a unidirectional microphone output.

10. The system as claimed in claim 7, wherein when the mSII determined from the primary microphone output signal is greater than or equal to the first predetermined threshold, the primary microphone output or the secondary microphone output bypasses the high pass filter.

11. A method for adapting an output of a microphone module having a primary microphone of a handsfree vehicle system based on a noise condition in a vehicle cabin, the method comprising the steps of: determining a modified Speech Intelligibility Index (SII) by multiplying a standard SII with a weighting coefficient, the weighting coefficient is based on unweighted signal to noise ratio and is configured to have a value between zero and one; linearizing a correlation between the modified SII and a Mean Opinion Score (MOS); determining a first predetermined threshold that defines a first noise condition with a low noise level, the first predetermined threshold is determined from the linearized correlation; determining a second predetermined threshold that defines a second noise condition with a high noise level, the second predetermined threshold is determined from the linearized correlation; outputting, at the primary microphone, a signal representative of noise in the vehicle cabin; determining an mSII that corresponds to the primary microphone output signal; comparing the mSII to the first predetermined threshold; and applying a high pass filter to the primary microphone output signal when the mSII is less than the first predetermined threshold, the high pass filter selects predetermined filter coefficients from a lookup table and applies them to the primary microphone output signal thereby adapting the primary microphone output signal from a first FR (Frequency Response) shape to a second FR shape.

12. The method as claimed in claim 11, wherein the steps of determining first and second predetermined thresholds further comprises the steps of:

determining a plurality of predetermined threshold stages, each predetermined threshold stage in the plurality of predetermined threshold stages is defined by a range of mSII values that correspond to a noise condition; and selecting and applying the predetermined filter coefficients from the lookup table according to the mSII value associated with the noise condition detected by the primary microphone.

13. The method as claimed in claim 12, wherein the step of determining a plurality of predetermined threshold stages further comprises the steps of:

determining a first predetermined threshold stage that is greater than or equal to the first predetermined threshold;

determining a second predetermined threshold stage that is less than the first predetermined threshold and greater than the first predetermined threshold;

determining a third predetermined threshold stage that is less than or equal to the second predetermined threshold; and selecting and applying the predetermined filter coefficients from the lookup table according to where in the first, second and third predetermined threshold stages the mSII falls.

14. The method as claimed in claim 11, wherein the microphone module further comprises a secondary microphone and the method further comprises the step of applying a beamforming algorithm to combine the primary and secondary microphone output signals to generate a unidirectional microphone output when the mSII for the primary microphone output signal is less than the first predetermined threshold and greater than the second predetermined threshold.

15. The method as claimed in claim 11, further comprising the step of outputting the signal without applying the high pass filter when the mSII for the signal is greater than or equal to the first predetermined threshold.

16. A method for adapting at least one microphone in a microphone module in a handsfree system to optimize Speech Intelligibility (SI) and Sound Quality (SQ) in a vehicle cabin, the method comprising the steps of:

measuring, at the least one microphone in the microphone module, a signal representative of noise in the vehicle cabin, the primary microphone has a first frequency response (FR) shape;

determining a modified Speech Intelligibility Index (mSII) by multiplying a standard SII with a weighting coefficient, the weighting coefficient is based on an unweighted signal to noise ratio and is configured to have a value between zero and one;

linearly correlating the mSII with a Mean Opinion Score (MOS);

determining a first predetermined threshold for mSII that defines a first noise condition;

determining a second predetermined threshold for mSII that defines a second noise condition;

comparing the signal to the first and second predetermined thresholds;

applying a high pass filter to the signal when the mSII for the signal is less than the first predetermined threshold, the high pass filter selects predetermined filter coefficients that, when applied, alter the FR shape of the at least one microphone from the first FR shape to a second FR shape; and outputting the signal with the second FR shape.

17. The method as claimed in claim 16 wherein the at least one microphone in the microphone module further comprises a primary microphone and a secondary microphone, the method further comprises the step of applying the high pass filter to either the primary microphone signal or the secondary microphone signal when the primary microphone signal is less than the first predetermined threshold and greater than the second predetermined threshold.

18. The method as claimed in claim 17, further comprising the step of applying a beamforming algorithm to combine the primary and secondary microphone output signals to generate a unidirectional microphone output when the primary microphone output signal is less than the first predetermined threshold and greater than the second predetermined threshold.

19. The method as claimed in claim 16, wherein the steps of determining first and second predetermined thresholds further comprise the steps of:

determining a plurality of predetermined threshold stages, each predetermined threshold stage in the plurality of predetermined threshold stages is defined by a range of mSII values that correspond to a noise condition; and selecting and applying the predetermined filter coefficients from the lookup table according to the mSII value of the noise condition detected by the primary microphone.

20. The method as claimed in claim 19, wherein the step of determining a plurality of predetermined threshold stages further comprises the steps of:

determining a first predetermined threshold stage that is greater than or equal to the first predetermined threshold;

determining a second predetermined threshold stage that is less than the first predetermined threshold and greater than the first predetermined threshold;

determining a third predetermined threshold stage that is less than or equal to the second predetermined threshold; and selecting and applying the predetermined filter coefficients from the lookup table according to where in the first, second and third predetermined threshold stages the mSII falls.

* * * * *